US010752351B2

(12) United States Patent
Rimanelli et al.

(10) Patent No.: US 10,752,351 B2
(45) Date of Patent: Aug. 25, 2020

(54) TILT-ROTOR UNMANNED AIR VEHICLE

(71) Applicant: DETROIT AIRCRAFT CORPORATION, Detroit, MI (US)

(72) Inventors: Jon Rimanelli, Grosse Pointe Woods, MI (US); Lai Yizhang, Huizhou (CN)

(73) Assignee: Detroit Aircraft Corporation, Detroit, MI (US)

( * ) Notice: Subject to any disclaimer, the term of this patent is extended or adjusted under 35 U.S.C. 154(b) by 383 days.

(21) Appl. No.: 15/816,319

(22) Filed: Nov. 17, 2017

(65) Prior Publication Data

US 2018/0134381 A1    May 17, 2018

Related U.S. Application Data

(60) Provisional application No. 62/423,487, filed on Nov. 17, 2016.

(51) Int. Cl.
*B64C 29/00*    (2006.01)
*B64D 47/08*    (2006.01)
(Continued)

(52) U.S. Cl.
CPC .......... *B64C 29/0033* (2013.01); *B64C 25/34* (2013.01); *B64C 25/405* (2013.01); *B64C 37/00* (2013.01); *B64C 39/024* (2013.01); *B64D 9/00* (2013.01); *B64D 47/08* (2013.01); *B64C 2201/027* (2013.01); *B64C 2201/042* (2013.01); *B64C 2201/066* (2013.01); *B64C 2201/088* (2013.01); *B64C 2201/102* (2013.01);
(Continued)

(58) Field of Classification Search
CPC ... B64C 29/0033; B64C 25/34; B64C 25/405; B64C 37/00; B64C 39/024; B64C 2201/027; B64C 2201/042; B64C 2201/066; B64C 2201/088; B64C 2201/102; B64C 2201/108; B64C 2201/127; B64C 2201/128; B64C 2201/146; B64C 2201/162; B64D 9/00; B64D 47/08; B64D 2211/00; Y02T 50/55
See application file for complete search history.

(56) References Cited

U.S. PATENT DOCUMENTS

| 4,149,688 A * | 4/1979 | Miller, Jr. ........... B64C 29/0033 244/12.4 |
| 2012/0232722 A1 * | 9/2012 | Fisher ................. B64C 29/0033 701/3 |

(Continued)

*Primary Examiner* — Rodney A Bonnette
(74) *Attorney, Agent, or Firm* — Quinn IP Law

(57) ABSTRACT

An unmanned air vehicle is provided. The unmanned air vehicle includes a frame having a center portion connecting two substantially parallel transversely spaced apart ele-wings. The ele-wings may store batteries and rotate along a forward axis to provide lift during a transition from vertical flight to linear flight. The landing gear may be connected to the ele-wings and configured to change pitch of the ele-wing to ensure stable flight during flight mode transition. A plurality of propellers, each having propeller drive motors, are attached to the frame and able to rotate from parallel position, relative to the center portion, for vertical flight to a perpendicular position, relative to the center portion, for linear flight. The propeller drives rotate on its axis and may be configured to propel the vehicle in a ground and flight mode.

21 Claims, 12 Drawing Sheets

(51) Int. Cl.
*B64D 9/00* (2006.01)
*B64C 25/34* (2006.01)
*B64C 39/02* (2006.01)
*B64C 37/00* (2006.01)
*B64C 25/40* (2006.01)

(52) U.S. Cl.
CPC .. *B64C 2201/108* (2013.01); *B64C 2201/127* (2013.01); *B64C 2201/128* (2013.01); *B64C 2201/146* (2013.01); *B64C 2201/162* (2013.01); *B64D 2211/00* (2013.01); *Y02T 50/55* (2018.05)

(56) References Cited

U.S. PATENT DOCUMENTS

2017/0158325 A1* 6/2017 Chen ................. B64C 29/02
2018/0370629 A1* 12/2018 Finlay ............... B64C 39/024

* cited by examiner

TILT-ROTOR UNMANNED AIR VEHICLE

CROSS REFERENCE TO RELATED APPLICATIONS

This application claims the benefit of U.S. Provisional Patent Application Ser. No. 62/423,487, filed Nov. 17, 2016, the disclosure of which is hereby incorporated by reference in its entirety.

TECHNICAL FIELD

The present disclosure relates to unmanned air vehicles.

BACKGROUND

Unmanned vehicles, also known as robots or drones, may be utilized for various purposes including various cargo delivery services, surveillance, and military operations.

SUMMARY

In one aspect of the disclosure, an unmanned air vehicle is provided. The unmanned air vehicle includes a frame having a center portion connecting two substantially parallel transversely spaced apart "ele-wings" that function as an elevator and aileron. The ele-wings may also adjust the wing angle of attack. The ele-wings are hinged to the center portion of the frame aft of the leading edge of the ele-wing.

In another aspect of the disclosure, an unmanned air vehicle is provided. The unmanned includes a plurality of spaced apart propellers, each having propeller drive motors, is attached to the center frame. The propellers are configured to propel the aircraft in a vertical flying mode and rotate 90 degrees or more to propel the air vehicle in a linear flying mode.

In another aspect of the disclosure, an unmanned air vehicle is provided. The unmanned air vehicle includes a frame having a center portion connecting two substantially parallel transversely spaced apart "ele-wings" that function as an elevator and aileron. The ele-wings also adjust the wing angle of attack. The ele-wings are hinged to the center portion of the frame aft of the leading edge of the ele-wing. A plurality of spaced apart propellers, each having propeller drive motors, is attached to the center frame. The propellers are configured to propel the aircraft in a vertical flying mode and rotate 90 degrees or more to propel the air vehicle in a linear flying mode. The ele-wings shall provide traditional elevator and aileron functions while having the ability to rotate the wing surface angle of attack in order to lower the wing stall speed which facilitates a smooth transition from vertical to linear flight. The ele-wings may be adjusted during flight to control take-off, linear cruising, descending, and landing.

In another aspect of the disclosure, a vertical take-off and landing unmanned air vehicle is provided. The vertical take-off and landing unmanned air vehicle includes a frame having a center portion and two substantially parallel spaced apart ele-wings connected to the center portion using a wing spar as its rotational axis point. A landing gear is attached to the center portion and is configured to support the vehicle in a ground mode, as well as support cargo in an air mode. The landing gear includes wheels, payload mounting tracks, and electrical conductors to support the air vehicle and/or cargo in the air mode. A plurality of propellers each having propeller drives are attached to the center frame and positioned forward and between the ele-wings. The plurality of propellers are configured to propel the vehicle in both a flying and ground mode. The propeller blades are configured to rotate to enable both vertical and linear flight modes. The vertical propeller positions are parallel to the ground and the center portion of the vehicle for vertical flight mode, and substantially perpendicular to the ground and center portion of the frame in linear flight mode. When the vehicle is operating in ground mode, the plurality of propellers may be rotated to propel the vehicle.

In another aspect of the disclosure, a vertical take-off and landing unmanned air vehicle is provided. The vertical take-off and landing unmanned air vehicle includes a frame having a center portion, two ele-wings, and a mechanism that connects the ele-wings to the center portion. A landing gear is attached to the center portion is configured to support the vehicle and cargo in both air and ground modes. A plurality of propellers each having propeller drives are attached to the center portion of the frame and positioned forward and between the ele-wings. The plurality of propellers are configured to rotate and propel the vehicle in a flying and ground mode. A battery is contained in the center portion and additional batteries or power sources may be attached to the landing gear cargo rails and configured to provide power to the propeller drives. In addition to additional power sources, various payloads maybe attached to the cargo rails such as a camera, a cargo container, or a ground vehicle are attachable.

BRIEF DESCRIPTION OF THE DRAWINGS

FIG. 7A is a partial schematic side view of a telescoping mechanism in a retracted position;

FIG. 7B is a partial schematic side view of the telescoping mechanism in an extended position;

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
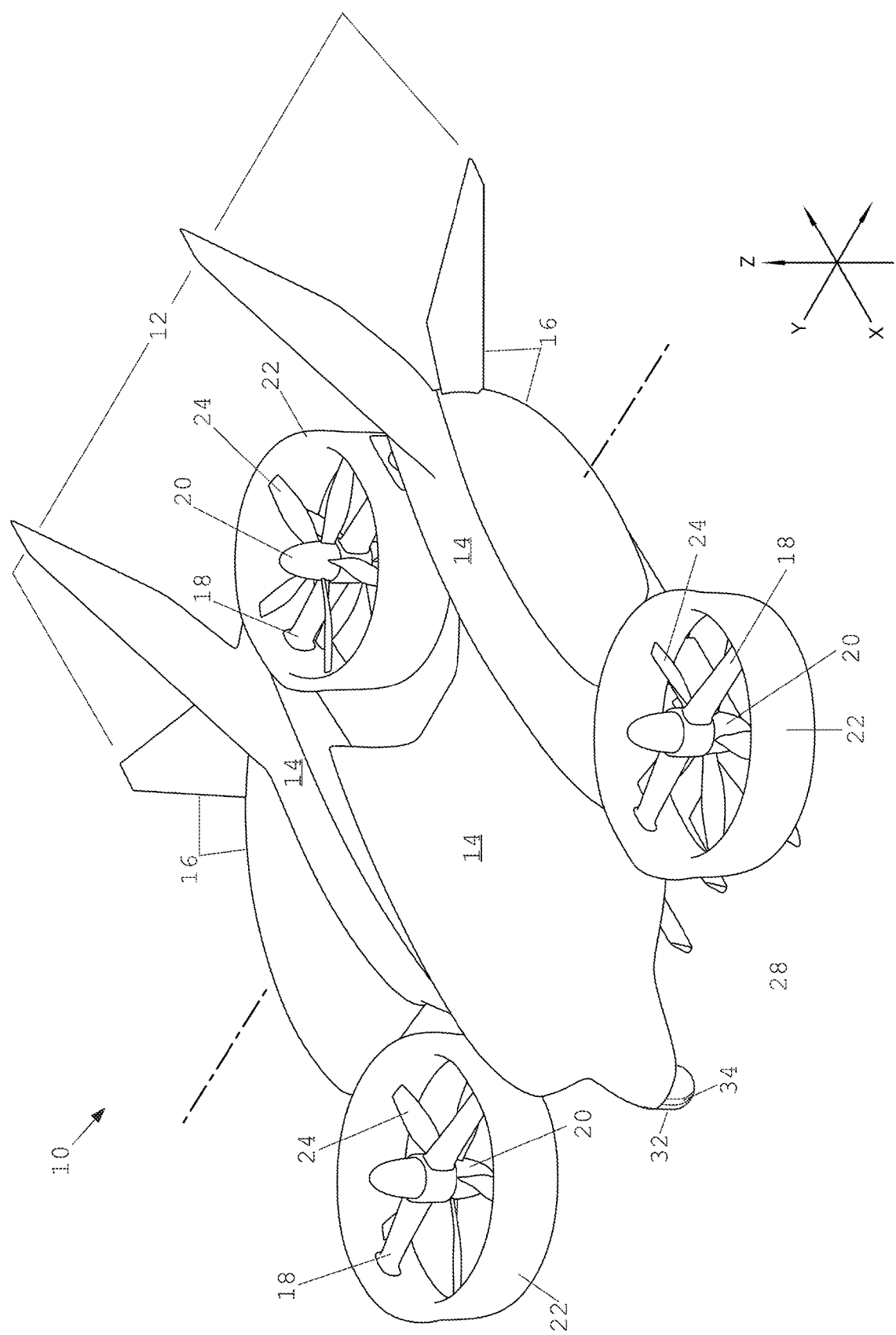
FIG. 1 is an isometric view of an unmanned air vehicle.
Figure 2:
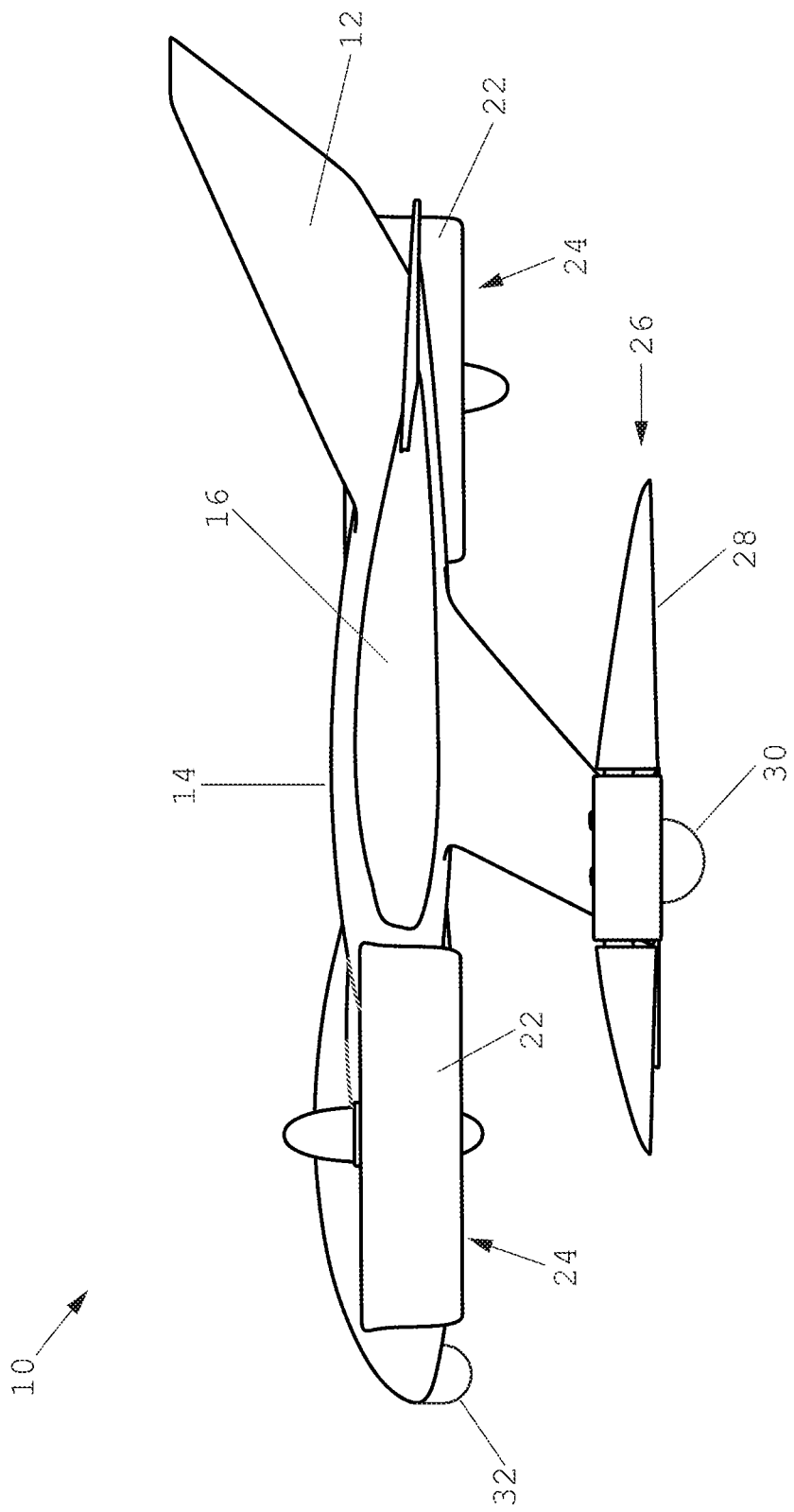
FIG. 2 is a side view of the unmanned air vehicle.
Figure 3:
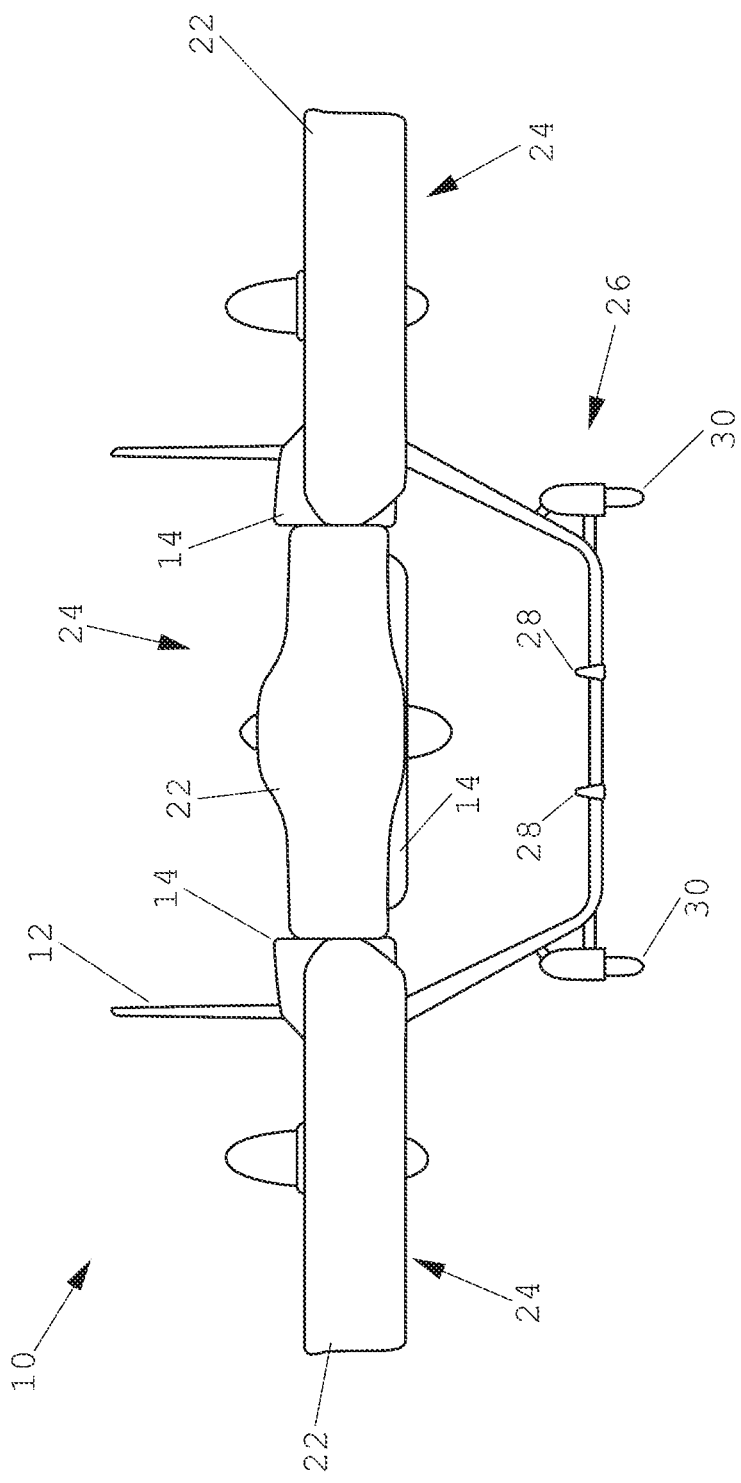
FIG. 3 is a rear view of the unmanned air vehicle.

Referring to FIGS. 1 through 3, an unmanned air vehicle 10 (hereinafter "vehicle") is illustrated. The vehicle 10 may be capable of vertical take offs and landings as well as linear flight. The vehicle 10 includes a frame 12. The frame 12 includes a center portion 14 and two ele-wings 16. The ele-wings 16 that function as an elevator and aileron. The ele-wings 16 may also pivot about an axis, relative to the center portion 14 of the frame 12, in order to adjust the wing angle of attack. The ele-wings 16 may be hinged to the center portion of the frame aft of the leading edge of the ele-wing 16. As such, the ele-wings 16 may be separately controlled to operate as an elevator to control the pitch angle of the vehicle 10 or to operate as an aileron to control the roll angle of the vehicle 10. When operating as an elevator, the two ele-wings 16 may be rotated up or down at the same angle, relative to the center portion 14 of the frame 12. When operating as an aileron, the one ele-wings 16 may be rotated up at a first angle while the other is rotated down at a second angle, relative to the center portion of the frame 12. Since the ele-wings 16 may be operated as both an elevator and an aileron, they may also be referred to elevons. A rotating mechanism 23 (embodiments described in further detail below) allows the ele-wings 16 to rotate about an axis. The rotating mechanism 23 may connect the ele-wings 16 to the center portion 14 of the frame 12.

A series of motor spars 18 will be used to connect the center portion 14 of the frame 12 to rotating propeller drives 20. A shroud 22 may surround the rotating propeller drives 20. The shroud 22 may be secured to the motor spars 18. The spars 18 may be configured to rotate about an axis to rotate the propeller drive 20. The rotating mechanism 23, such as a servo motor, that is located within the center portion 14 of the frame 12 may be used to rotate the spars 18. The ele-wings 16 may be parallel and spaced apart from each other by the center portion 14 of the frame 12. The elements of the frame 12, including the center portion 14, ele-wings 16, and motor spars 18, may be made from any structural material such as metals (including steel, titanium, aluminum), metal alloys, plastics (including thermoplastics and thermosetting resins and polymers), fiber reinforced polymers (including carbon fibers, glass fibers, basalt fibers, aramid fibers or other structural fibers reinforced in epoxy, vinylester, polyester thermosetting plastic, phenol formaldehyde resins, or other thermosetting plastic), or any other structural material or composite material that may be appropriate when taking into account costs and weigh restrictions.

The vehicle 10 may also include a plurality of propellers 24 that are attached to the spars 18. The spars 18 may also be configured to rotate the propellers 24 about an axis, along with the propeller drives 20. The propellers 24 may be positioned in front of and between the ele-wings 16. The plurality of propellers 24 may each have a propeller drive 20 motor that is configured to rotate the propellers 24 in order to propel the vehicle 10 in a flying mode or ground mode. The propellers 24 are shown as a five blade propeller design. However, the propellers 24 may include multiple blades of two or more. Furthermore, although three propellers 24 are depicted in the Figures, the disclosure should be not be construed as limited to unmanned air vehicles having three propellers, but should be construed to include unmanned air vehicles having one or more rotating propellers, and preferably three or more spaced apart rotating axis propellers.

The propellers 24 may be made from any material such as metals (including titanium and aluminum), metal alloys, plastics (including thermoplastics and thermosetting resins and polymers), fiber reinforced polymers (including carbon fibers, glass fibers, basalt fibers, aramid fibers or other structural fibers reinforced in epoxy, vinylester, polyester thermosetting plastic, phenol formaldehyde resins, or other thermosetting plastic), or any other material or composite material that may be appropriate when taking into account the costs, weigh restrictions, and functionality of the propellers.

Landing gear 26 is configured to support the vehicle 10 when in a parked condition on the ground. The landing gear 26 may be used to support cargo. The landing gear 26 may be connected to the center portion 14 of the frame 12. The landing gear 26 may also be made from any structural material such as metals (including steel, titanium, aluminum), metal alloys, plastics (including thermoplastics and thermosetting resins and polymers), fiber reinforced polymers (including carbon fibers, glass fibers, basalt fibers, aramid fibers or other structural fibers reinforced in epoxy, vinylester, polyester thermosetting plastic, phenol formaldehyde resins, or other thermosetting plastic), or any other structural material or composite material that may be appropriate when taking into account costs and weigh restrictions. The landing gear 26 may also include mounting or cargo rails 28 that may be used to secure a payload to the vehicle 10. The cargo rails 28 may secure the cargo payload within the center of gravity of the vehicle 10. The cargo rails 28 may be positioned between wheels 30 of the landing gear 24. The wheels 30 may allow the vehicle 10 operate in a ground mode where the vehicle 10 moves or taxis along the ground. The landing gear 26 may also include electrical contacts to provide power from the payload to the vehicle 10 or vice versa.

Figure 4:
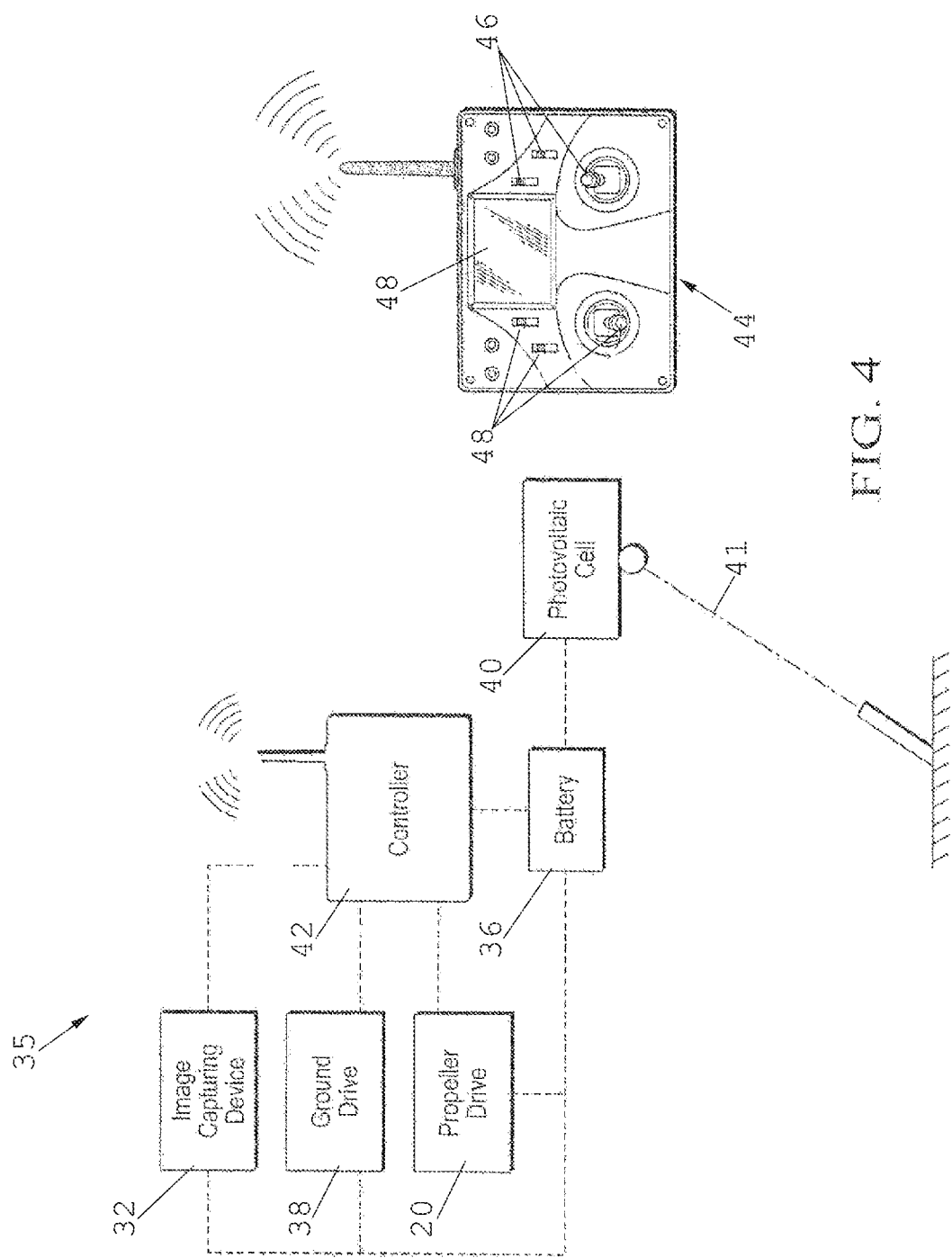
FIG. 4 is a diagram representative of an the electrical and control system of the unmanned air vehicle.

The vehicle 10 may also include an image capturing device 32, such as a camera, that provides feedback to a human machine interface 44 (HMI). The HMI 44 is depicted in FIG. 4. The image capturing device 32 may provide video, infrared, or other forms of imaging back to the HMI 44. The image capturing device 32 may be shiftably mounted to the frame 12 in order to vary the field of view of the image capturing device 32. The image capturing device 32 may be capable of rotating about several axes (including horizontal and vertical axes) to increase the field of view. The image capturing device 32 illustrated may be attached to the front side of the center portion 14 of the frame 12. The image capturing device may include a window or pane 34 that allows an internally mounted lens to view the surrounding environment. The lens may rotate about the Y axis increasing the field of view through the panes 34. The image capturing device 32 may also be mounted to a rotating device that allows the image capturing device 32 to rotate about the Z axis also increasing the field of view. In addition, a second image capturing device (not show) may be mounted to the back side of the center portion 14 of the frame 12 to further increase the field of view. The image capturing device 32 may also be mounted to a shifting device (not shown) that allows the image capturing device to transition from a front facing position along the front side of the center portion 14 of the frame 12 to a lower facing position along the lower side of the center portion 14 of the frame 12, further increasing the field of view of the image capturing device 32.

The disclosure however, should not be limited to the type of image capturing devices and devices that increase the field of view of the image capturing device described herein, but should include any type of image capturing device and any type of rotating, sliding, or other mechanism that increases the field of view of an image capturing device 32. For example a mechanism that shifts the image capturing device 32 to an upper position along the top side of the center portion 14 of the frame 12 may be included.

Referring to FIG. 4, a diagram representative of an electrical and control system of the unmanned air vehicle 10 is illustrated at 35. A battery 36 may be used to supply to power the propeller drives 20, which may include propeller motors, when the vehicle 10 is operating in a flying mode. The battery 36 may also be used to supply power to a ground drive 38 to propel the wheels 30 when operating in ground mode. The ground drive 38 may include motors to propel the wheels 30 when the vehicle 10 is operating in the ground mode. The battery 36 may be attached to the frame 12, or more specifically may be housed in the center portion 14 of the frame 12. The battery 36 may be recharged by plugging the battery 36 into a power outlet or via a photovoltaic cell 40. The photovoltaic cell 40 may be capable of recharging the battery 36 when a laser beam 41 is directed onto the photovoltaic cell 40 (also known as power beaming). Power beaming may be used while the vehicle 10 is not operating or while the vehicle 10 is operating in either the flying mode or ground mode. Alternative power sources, such as an internal combustion engine (ICE), may be used in place of a battery to power the propeller drives 20 and the ground drives 38. Alternatively, various combinations of power sources may be used such as an electrical/ICE hybrid having a quiet electric mode and a long range ICE mode.

A controller 42 is configured to control the propeller drives 20 of the vehicle 10, when the vehicle 10 is either in the ground mode or the flying mode. The controller 42 may include a receiver and transmitter (or alternatively a transceiver) for communicating with an HMI 44. The HMI 44 may also include a receiver and transmitter (or alternatively a transceiver) for communicating with the controller 42. The controller 42 and HMI 44 may communicate with each other via wireless network technology, Bluetooth® technology, infra-red transmission technology, radio frequency, or any other form of wireless communication.

The HMI 44 may include a series of control buttons, levers, or other devices (control devices 46) that are configured to communicate a user input to the HMI 44. The HMI 44 may then communicate the user input to the controller 42, which is located on the vehicle 10, allowing a user to remotely control the vehicle 10 when the vehicle 10 is operating in the ground mode or flying mode. The controller 42 may further transmit video, infrared, or other forms of imaging from the image capturing device 32 back to an imaging display device 48, which may be located on the HMI 44.

While illustrated as one controller, the controller 42 may be part of a larger control system and may be controlled by various other controllers throughout the vehicle 10. It should therefore be understood that the controller 42 and one or more other controllers can collectively be referred to as a "controller" that controls various actuators, drives, motors, etc. in response to various sensors, inputs, signals, etc. The controller 42 may include one or more microprocessors or central processing units (CPUs) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 42 in controlling the vehicle 10.

Figure 5:
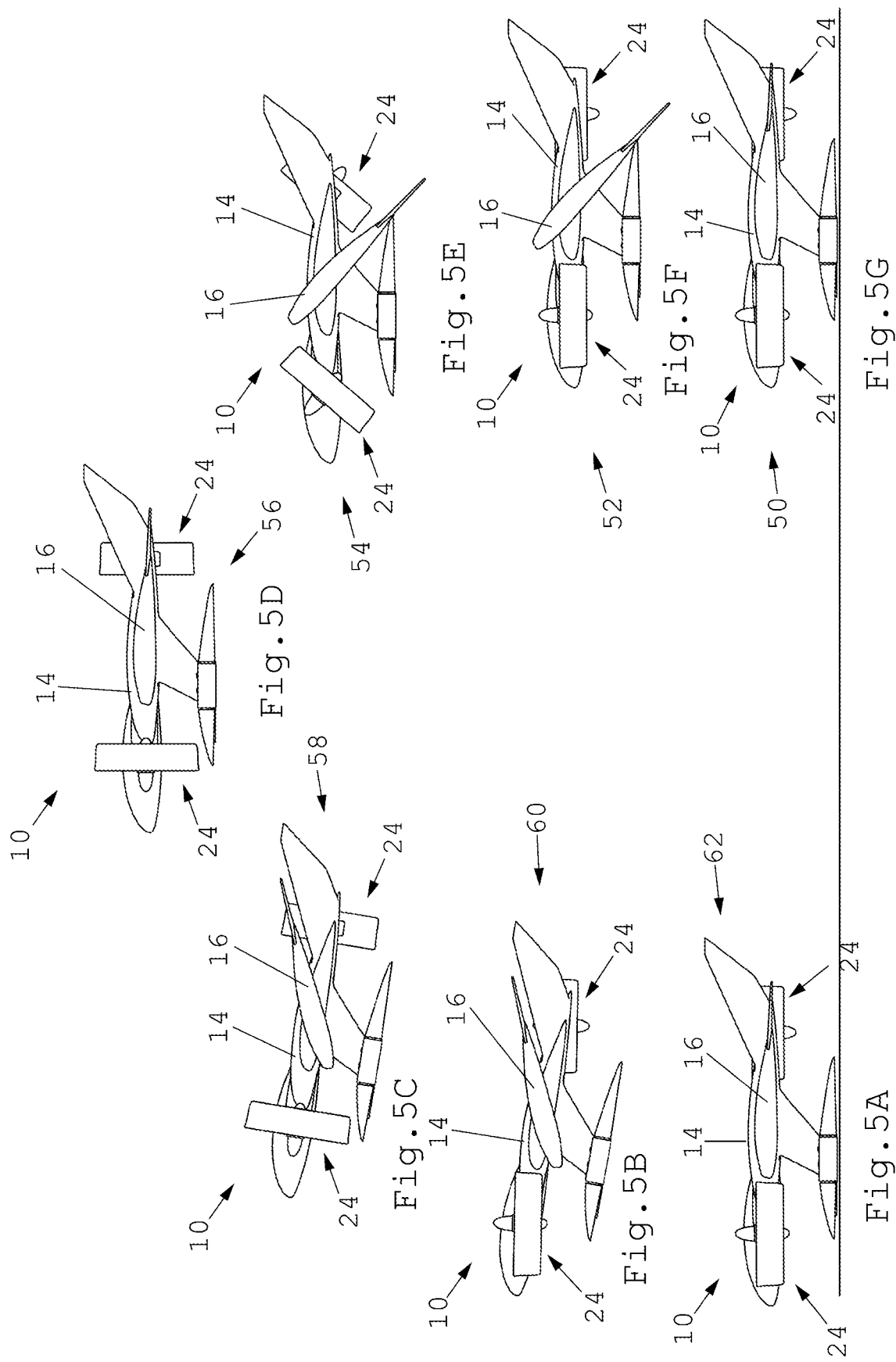
FIGS. 5*a*-5*g* include images that depict the vehicle transitioning from a grounded position to a flying position and then back to the grounded position.

Referring to FIGS. 5A-5G, several images depicting the vehicle 10 transitioning from a grounded position (as illustrated in FIG. 5A) to a flying position (as illustrated in FIG. 5D) and then back to the grounded position (as illustrated in FIG. 5G). FIGS. 5B, 5C, 5E, and 5F illustrate the transition between the grounded position of FIGS. 5A and 5G and the flying position of FIG. 5D. The propellers 24 and ele-wings 16 may each be rotated up to 90° relative to the center portion 14 of the frame 12 in either a clockwise or counterclockwise direction. A first position illustrates a grounded position 50 (FIG. 5G) where the propellers 24 and ele-wings 16 are both rotated such that they are approximately parallel with the center portion 14 of the frame 12. A second position illustrates a vertical takeoff position 52 (FIG. 5G) from the grounded position 50. The propellers 24 remain approximately parallel with the center portion 14 of the frame 12 while the ele-wings 16 are angled upwards when in the vertical takeoff position 52. A third position illustrates a transitioning position 54 (FIG. 5E) from the vertical takeoff position 52 to a fourth, in-flight (or linear flight) position 56 (FIG. 5D). In the transitioning position 54, the propellers 24 begin to rotate from a position that is approximately parallel with the center portion 14 of the frame 12 to a position that is approximately perpendicular with the center portion 14 of the frame 12, while the ele-wings 16 remain angled upwards. In the in-flight position 56 (FIG. 5D), the propellers 24 reach a position that is approximately perpendicular with the center portion 14 of the frame 12 while the ele-wings 16 return to a position that is approximately parallel with the center portion 14 of the frame 12. A fifth position illustrates a transitioning position 58 (FIG. 5C) from the in-flight position 56 (FIG. 5D) to a vertical landing (or sixth) position 60 (FIG. 5B). In the transitioning position 58 (FIG. 5C), the propellers 24 will rotate from a position that is approximately perpendicular to approximately parallel to the center portion 14 of frame while ele-wings 16 are angled downwards. In the vertical landing position 60 (FIG. 5B), the propellers 24 are approximately parallel to the center portion 14 of the frame 12 while the ele-wings 16 remain angled downward. A seventh position illustrates a return to a grounded position 62 (FIG. 5A) from the vertical landing position 60 (FIG. 5B). In the grounded position 62 (FIG. 5A), the propellers 24 and ele-wings 16 are both returned to positions that are approximately parallel with the center portion 14 of the frame 12.

Figure 6:
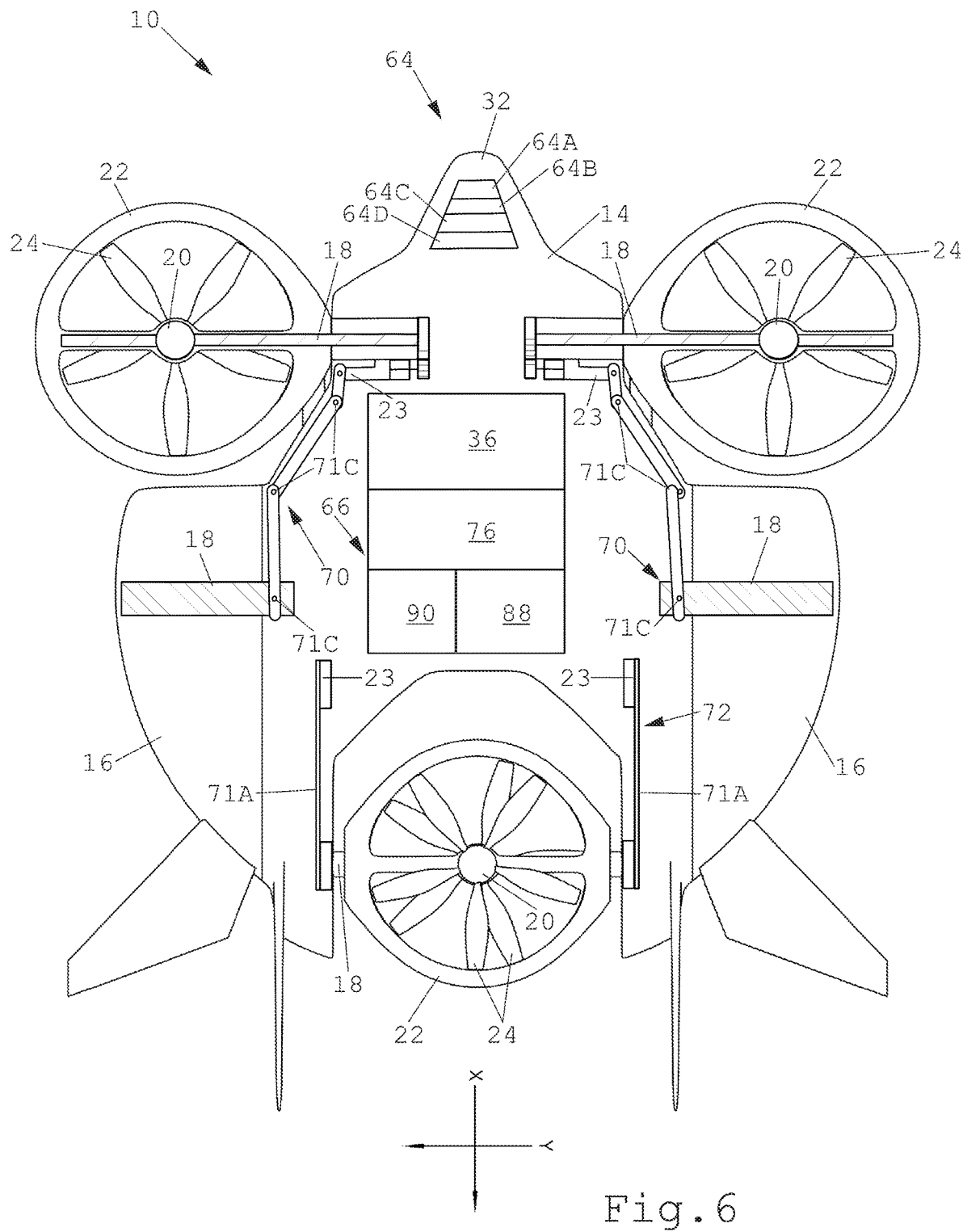
FIG. 6 is a top view of the unmanned air vehicle illustrating mechanisms that may be used to rotate propellers and the ele-wings.

Referring to FIG. 6, a mechanism that may be used to rotate the spars 18, that in turn causes the propeller drives 20 and propellers 24 to rotate, is illustrated. FIG. 6 also illustrates a mechanism that may be used to rotate the ele-wings 16 and various electrical systems of the vehicle 10. Motor spars 70 may be utilized to rotate the ele-wings 16. A series of shafts 71A, gears 71B, pulleys 71C, belts, chains, etc. may be used to connect actuators to the spars 18 in order to rotate the propellers 24 and the ele-wings 16. A specific combination of shafts 71A, gears 71B, pulleys 71C, belts, or chains may be used depending on requirements and/or spatial limitations. The actuators 23 that are used to rotate the propellers 24 and/or ele-wings 16 may consist of electric motors such as servomotors.

The vehicle 10 may also include various electrical systems 64 that are used to control various functions of the vehicle 10. The systems 64 may include devices that are configured to receive data and transmit the data to the controller 42. The systems 64 may include radar 64A, lidar 64B, flight control computer 64C, communication hardware/software 64D, camera 32, etc. The controller 42 may include control logic and/or algorithms that are configured to control various mechanical components of vehicle 10, such as the propellers 24 and/or the ele-wings 16, including any associated actuators. The vehicle 10 may include bays 66 (illustrated in FIGS. 6, 9, and 10) to store batteries 36, power distribution systems 76, and various control systems of the vehicle 10. The various control systems of the vehicle 10 may include a vehicle speed control system 88 and a control system 90 that operates the various actuators to rotate the propellers 24 and/or the ele-wings 16.

Figure 7:
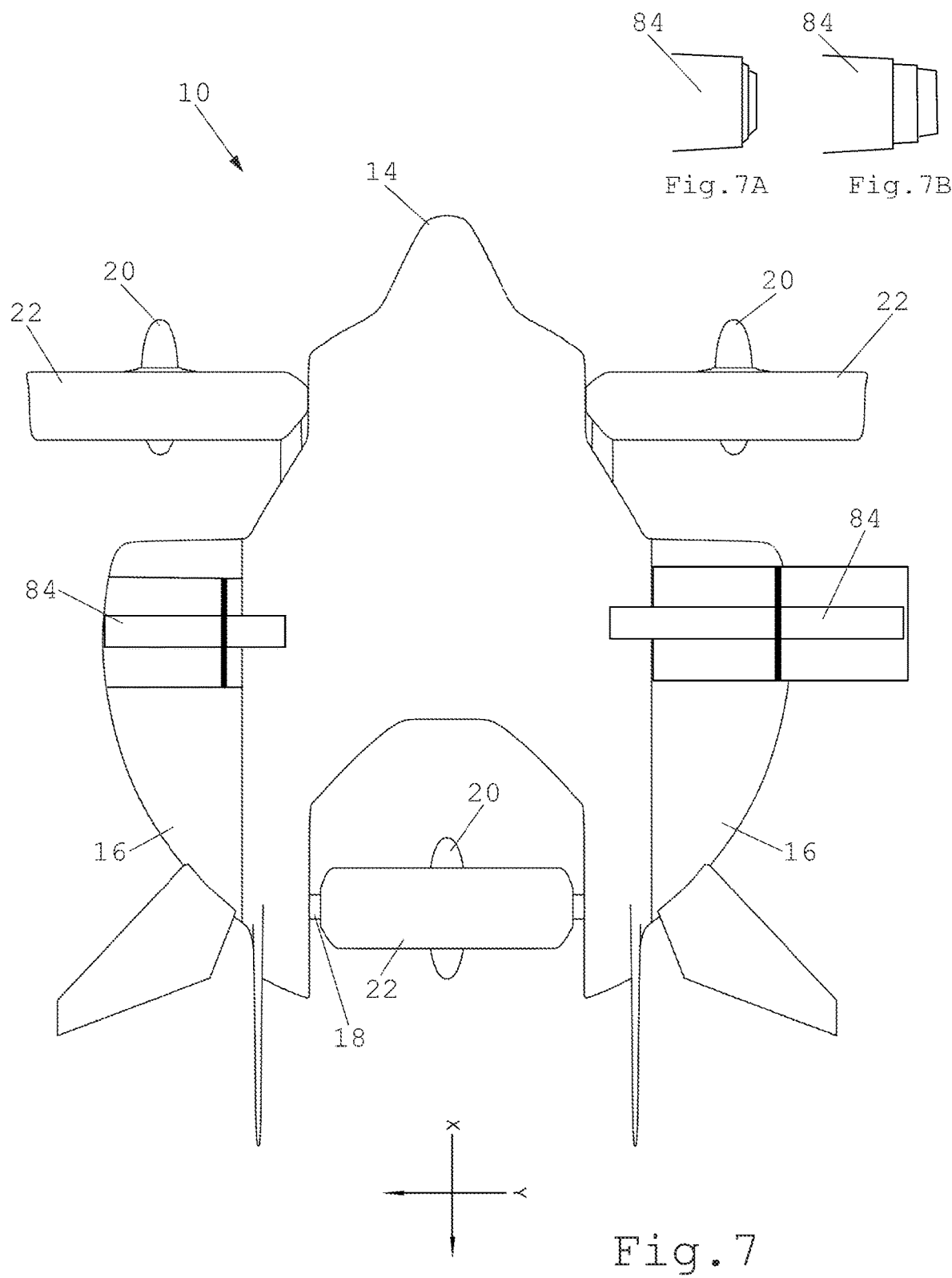
FIG. 7 is a top view of an alternative embodiment of the unmanned air vehicle.

Referring to FIG. 7, an alternative embodiment of the vehicle 10 is illustrated. The alternative embodiment illustrated in FIG. 7 includes extendable/retractable wings 16 that extend outward from the ele-wings 16. The extendable/retractable wings 16 may include telescopic mechanisms 84 (as illustrated in FIGS. 7A and 7B) that extend and retract the extendable/retractable wings 16. FIG. 84 schematically illustrates the telescopic mechanism 84 in a retracted position and FIG. 7B schematically illustrates the telescopic mechanism in an extended position. Alternatively, ball nut and ball screw combinations that are powered by actuators, such as a servo motors, may be used to extend and retract the extendable/retractable wings 16.

Figure 8:
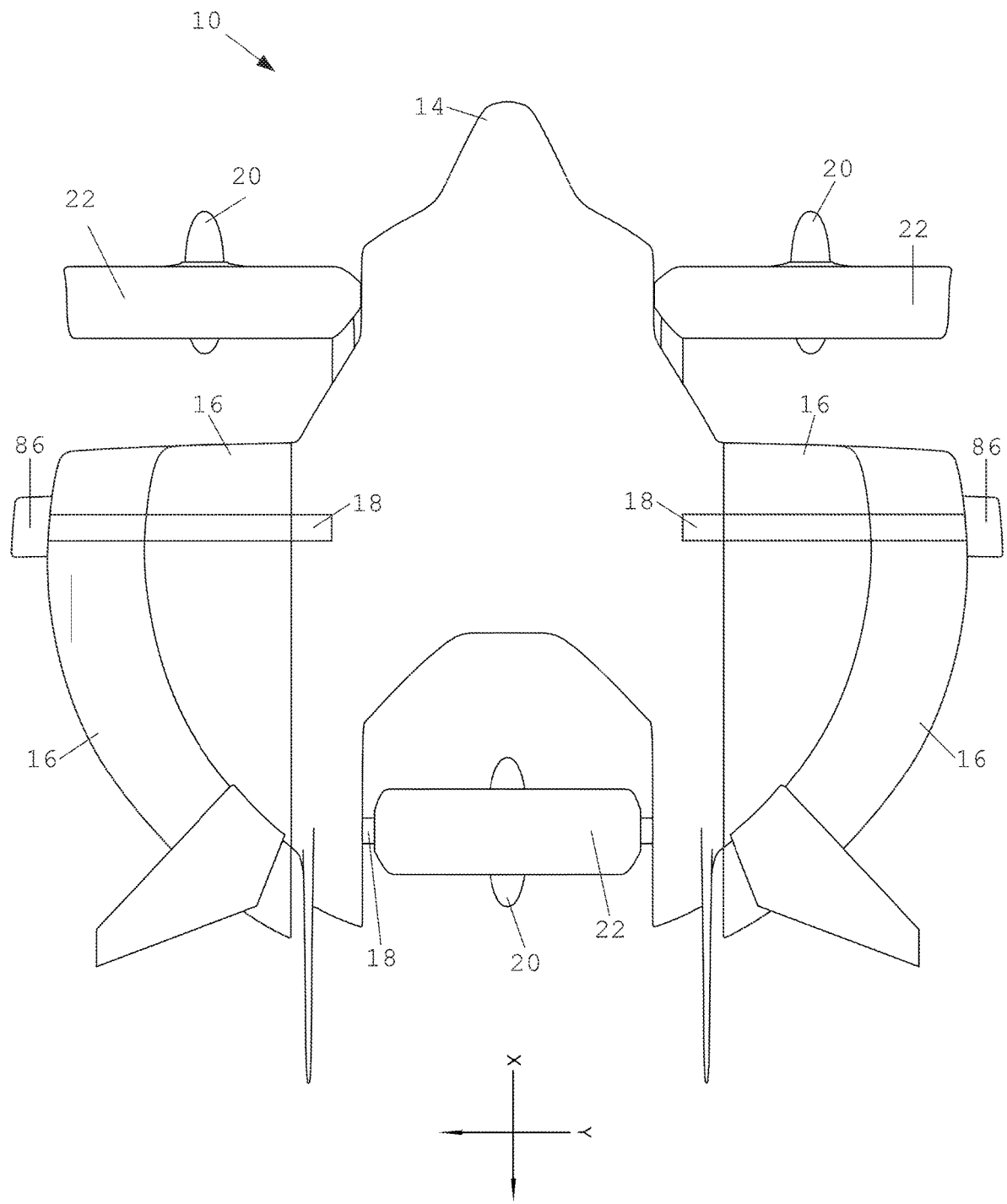
FIG. 8 is a top view of another alternative embodiment of the unmanned air vehicle.

Referring to FIG. 8, another alternative embodiment of the vehicle 10 is illustrated. The alternative embodiment illustrated in FIG. 8 includes larger ele-wings 16 that may increase the range and the loading capacity of the vehicle 10. The larger ele-wings 16 may be permanently secured to the vehicle 10 or alternatively may be wing extensions 86 that may be temporarily secured to the vehicle 10 when it is desirable to increase the range and/or the loading capacity of the vehicle 10.

Figure 9:
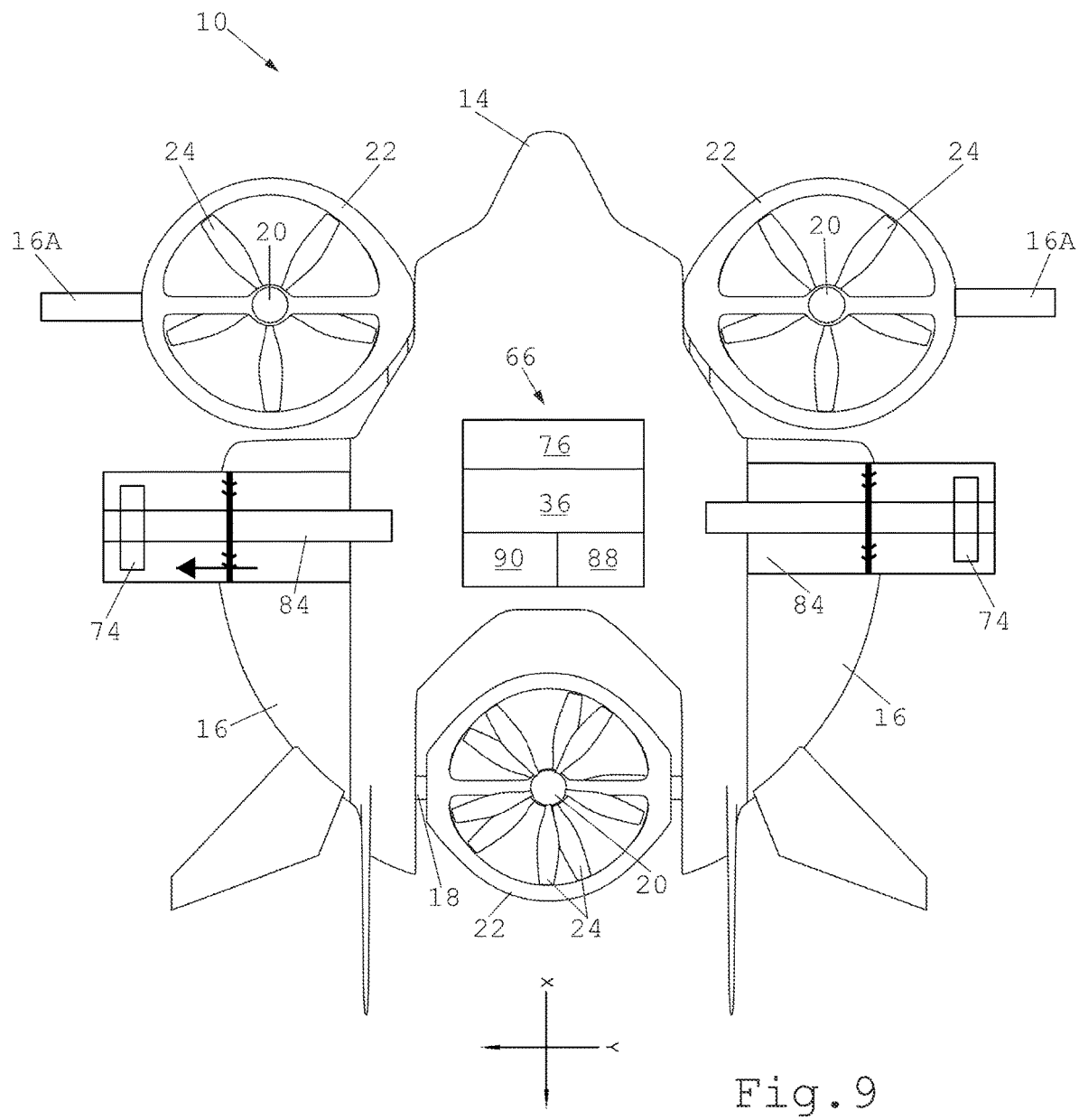
FIG. 9 is a top view of yet another alternative embodiment of the unmanned air vehicle.

Referring to FIG. 9, yet another alternative embodiment of the vehicle 10 is illustrated. The alternative embodiment of the vehicle 10 illustrated in FIG. 9 provides a modular wing design to adapt to a variety of mission profiles relating to range, loading, etc. The vehicle 10 may include additional batteries 74 that are secured to the extendable/retractable wings 16. Also included in this alternative embodiment may be a pair of folding wings 16A that extend outward from the shroud 22 that protects the propellers 24. The pair of folding wings 16A may be hingedly connected to the shroud 22 to provide additional range to the vehicle 10, while being foldable and/or removable for storage of the vehicle 10. Additionally, the mechanism 70 may be configured to adjust or shift a pivot point 92 of the ele-wing 16 fore/aft of the vehicle 10 to change flight dynamics of the vehicle 10.

Figure 10:
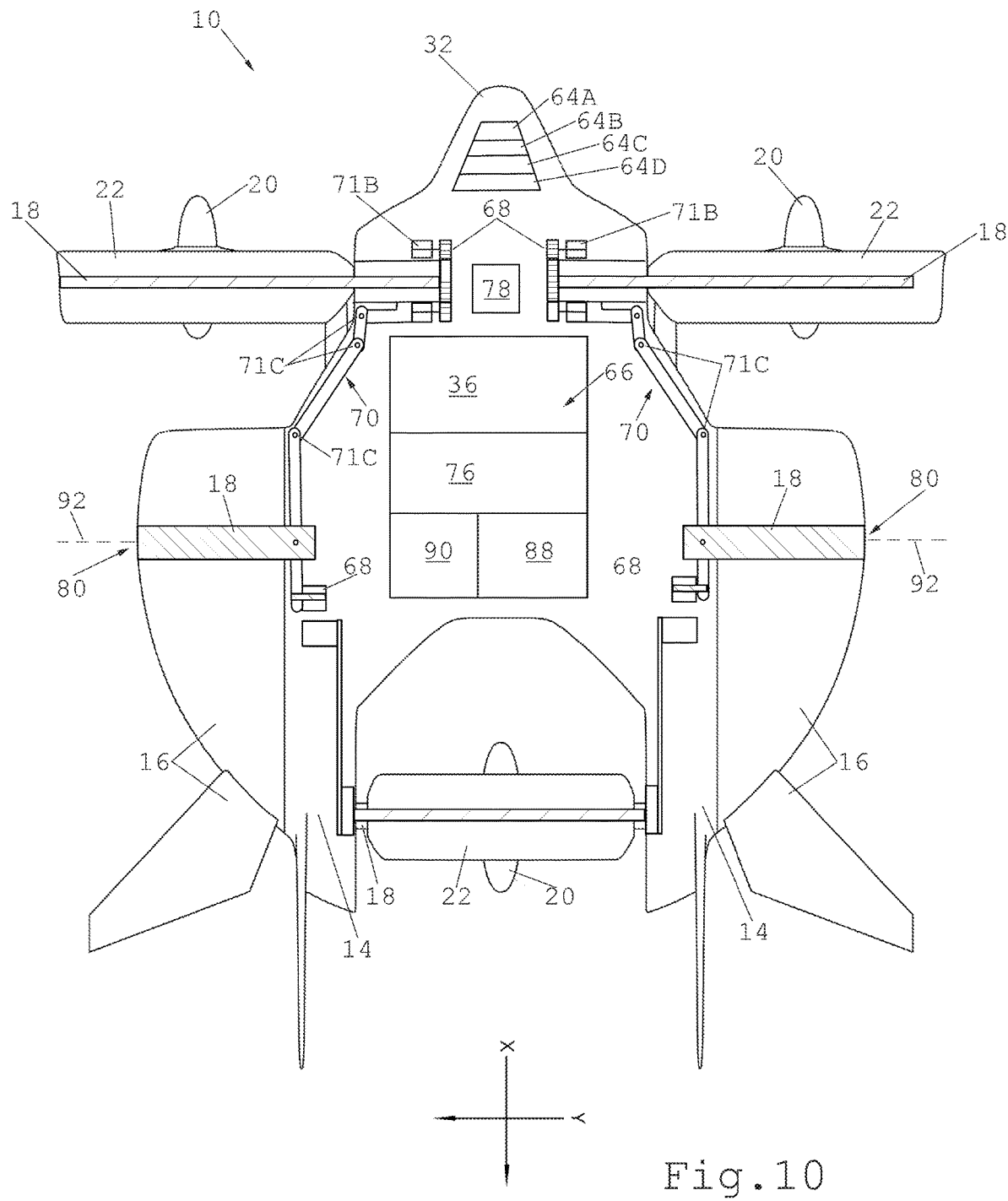
FIG. 10 is a top view of an alternative embodiment of the unmanned air vehicle depicted in FIG. 6.

Referring to FIG. 10, an alternative embodiment of the embodiment depicted in FIG. 6 is illustrated. The embodiment in FIG. 10 includes redundant actuators 68 (e.g., servomotors) that are used to rotate the propellers 24 and/or the ele-wings 16. FIG. 10 also includes a safety parachute 78 to protect the vehicle 10 from damage caused by a freefall. Ports 80 for receiving the wing extensions described in the embodiment depicted in FIG. 8 are also illustrated.

Figure 11:
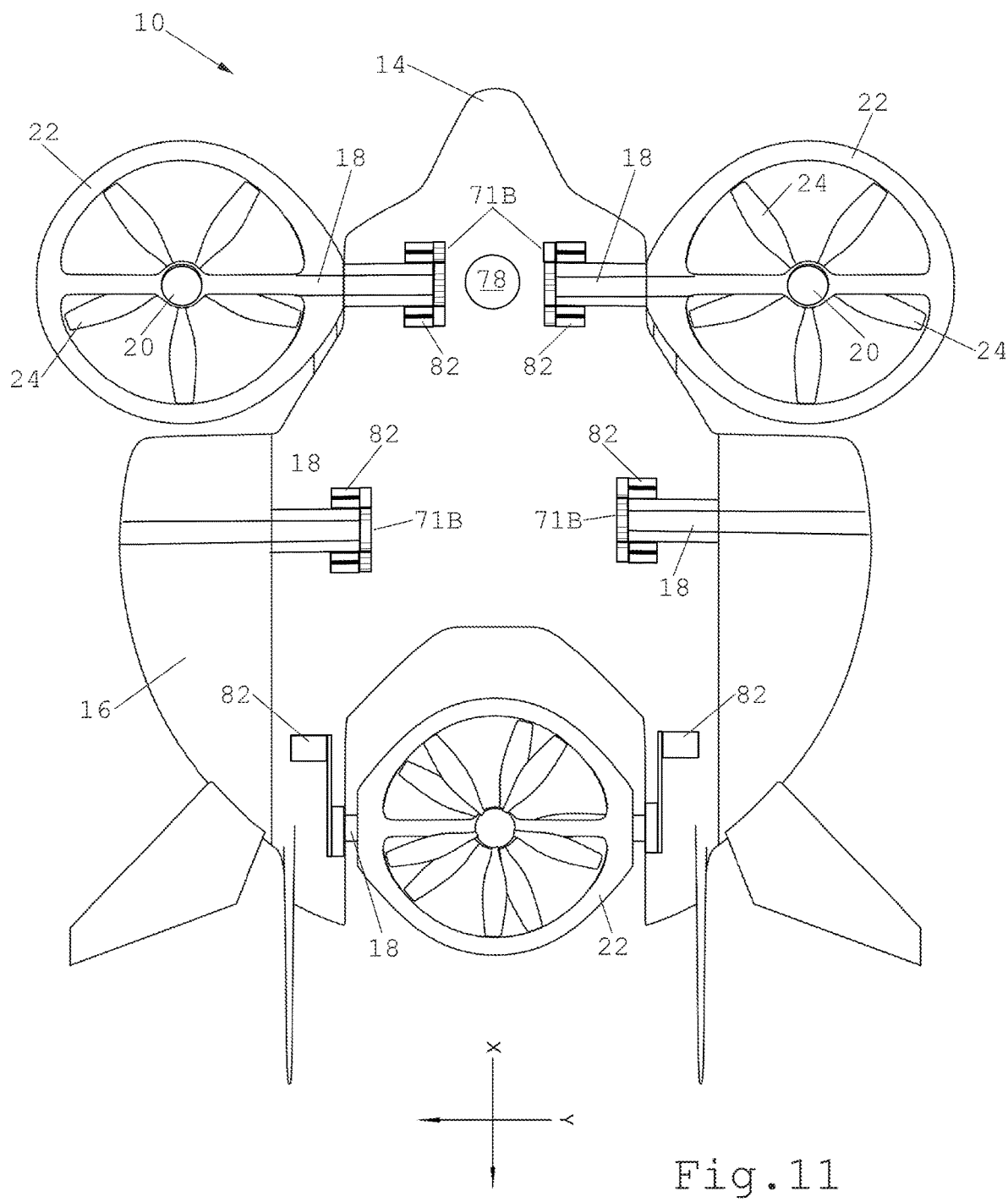
FIG. 11 is a top view of another alternative embodiment of the unmanned air vehicle.

Referring to FIG. 11, another alternative embodiment of the vehicle 10 is illustrated. The alternative embodiment depicted in FIG. 11 illustrates dual servomotors connected to each of the spars 18 that are used to rotate the propeller drives 20 (including the propellers 24) and the spars 18 that are used to rotate the ele-wings 16. The dual servomotors 82 may be connected to the spars through gears 71B.

Figure 12:
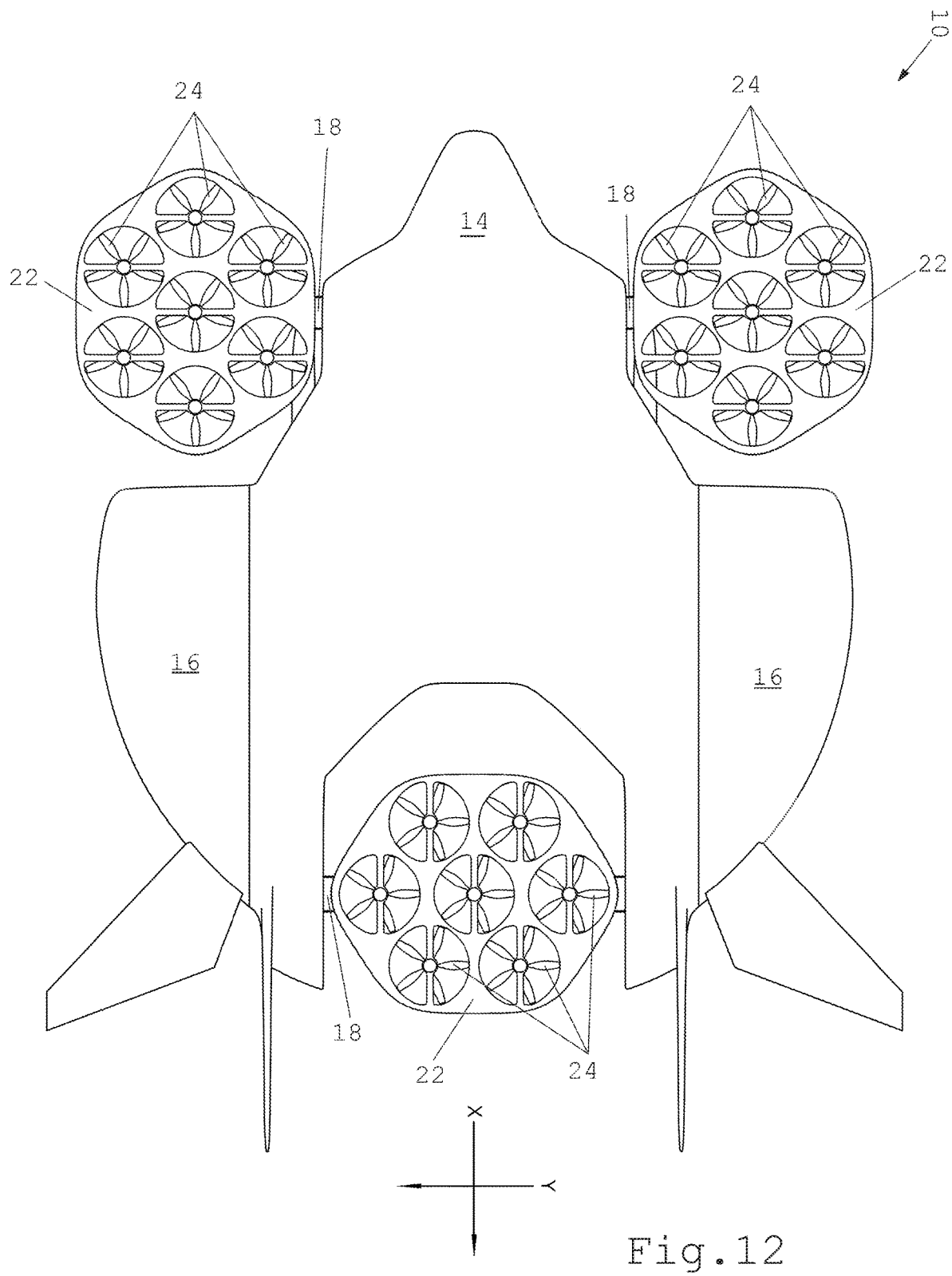
FIG. 12 is a top view of yet another alternative embodiment of the unmanned air vehicle.

Referring to FIG. 12, yet another alternative embodiment of the vehicle 10 is illustrated. The alternative embodiment depicted in FIG. 12 includes a plurality of propellers 24 that are secured to a single rotatable housing or shroud 22. The plurality of propellers allows for a differential thrust across the single rotatable housing or shroud 22 (i.e., some propellers may be providing more force than others or some propellers may be providing a force in one direction while others are providing force in an opposite direction). The differential thrust alone may control the rotational position of a single rotatable housing or shroud 22.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

The invention claimed is:

1. An unmanned air vehicle comprising:
   a frame having a center portion rotatably connect to two parallel transversely spaced apart ele-wings that provide lift during a transition from vertical to linear flight;
   a plurality of propellers, each having a propeller drive motor, rotatably attached to the center portion frame in front of the ele-wings, wherein the propeller drive motors and propellers are configured to propel the vehicle in a ground mode and a flying mode.

2. The vehicle of claim 1, further comprising a controller configured to control the drive motors in the ground mode and the and in the flying mode.

3. The vehicle of claim 2, further comprising a human machine interface that wirelessly communicates with the controller allowing a user to control the vehicle in the ground mode or the flying mode.

4. The vehicle of claim 3, further comprising an image capturing device connected to the frame that provides feedback to the human machine interface.

5. The vehicle of claim 4, wherein the image capturing device is shiftably mounted to the frame in order to vary the field of view of the image capturing device.

6. A vertical take-off and landing unmanned air vehicle comprising:
   a frame having a center portion and two parallel transversely spaced apart ele-wings rotatably connected to the center portion;
   a landing gear attached to the ele-wings, configured to secure a payload in a ground mode or a flight mode, the landing gear including a camera and a battery; and
   a plurality of propellers, each having a propeller drive, attached to the frame and configured to rotate on an axis, at least one of the propellers being positioned in front of the ele-wings, at least one of the propellers being positioned between the ele-wings, wherein the plurality of propellers are configured to propel the vehicle in a flying mode or a ground mode, and wherein the propellers and drives are configured to rotate positions, the positions ranging from parallel to the center portion of the frame to perpendicular to the center portion of the frame so that the vehicle may take-off vertically and transition to linear flight when the vehicle is operating in the flight mode.

7. The vehicle of claim 6, further comprising a controller configured to control the propellers when the vehicle is in the ground mode and in the flying mode.

8. The vehicle of claim 7, further comprising a human machine interface that wirelessly communicates with the controller allowing a user to control the vehicle in the ground mode or the flying mode.

9. The vehicle of claim 8, further comprising an image capturing device connected to the frame that provides feedback to the human machine interface.

10. The vehicle of claim 9, wherein the image capturing device provides video feedback to the human machine interface.

11. The vehicle of claim 9, wherein the image capturing device provides infrared feedback to the human machine interface.

12. The vehicle of claim 9, wherein the image capturing device is shiftably mounted to the frame in order to vary the field of view of the image capturing device.

13. A vertical take-off and landing unmanned air vehicle comprising:
a frame having a center portion, two ele-wings, and a first rotating mechanism that enables the ele-wings rotate relative to the center portion to create lift when transitioning from vertical to linear flight;
a landing gear, attached to the ele-wings, configured to support the vehicle and cargo in a ground or air mode;
a plurality of propellers, each having a rotating propeller drive, attached to the center frame, the plurality of propellers having second rotating mechanism configured to rotate the propellers relative to the center portion, wherein the propellers are configured to propel the vehicle in flying and ground modes; and
a series of batteries mounted inside the ele-wings configured to provide power to the propeller drives;
additional batteries mounted on the landing gear and configured to provide power to the propeller drives; and
a power system mounted on the landing gear and configured to provide power to the propeller drives.

14. The vehicle of claim 13, where a photovoltaic cell attached to the frame is configured to recharge the battery.

15. The vehicle of claim 14, wherein the photovoltaic cell is configured to recharge the battery through power beaming.

16. The vehicle of claim 13, wherein at least one of the plurality of propellers is positioned in front of the ele-wings.

17. The vehicle of claim 16, wherein at least one of the plurality of propellers is positioned between the ele-wings.

18. An unmanned air vehicle comprising:
a frame having a center portion;
a pair of ele-wings rotatably affixed to and extending outward on opposing sides of the center portion, the ele-wings configured align with the center portion during linear flight, rotate downward relative to the center portion during a vertical takeoff, and rotate upward relative to the center portion during a vertical landing; and
at least one propeller rotatably affixed to the center portion, the at least one propeller configured to rotate to a linear flight position, which forward relative to the center portion during linear flight, and rotate to a takeoff or landing position, which is upward relative to the center portion during vertical takeoffs and landings.

19. The vehicle of claim 18, further comprising landing gear configured to support the vehicle when in a parked condition on the ground.

20. The vehicle of claim 19, wherein the landing gear includes a pair of wheels.

21. The vehicle of claim 20, wherein the landing gear includes cargo rails that extend parallel to the center portion of the frame that are configured to secure a payload to the vehicle and position the payload within the center of gravity of the vehicle.

* * * * *

UNITED STATES PATENT AND TRADEMARK OFFICE
CERTIFICATE OF CORRECTION

| | | |
|---|---|---|
| PATENT NO. | : 10,752,351 B2 | Page 1 of 1 |
| APPLICATION NO. | : 15/816319 | |
| DATED | : August 25, 2020 | |
| INVENTOR(S) | : Jon Rimanelli and Yizhang Lai | |

It is certified that error appears in the above-identified patent and that said Letters Patent is hereby corrected as shown below:

On the Title Page

Item (72) The second inventor's name should be "Yizhang Lai".

Signed and Sealed this
Twenty-third Day of February, 2021

Drew Hirshfeld
*Performing the Functions and Duties of the
Under Secretary of Commerce for Intellectual Property and
Director of the United States Patent and Trademark Office*